United States Patent [19]

Baezold

[11] 3,757,906
[45] Sept. 11, 1973

[54] MECHANICAL ADJUSTING ARRANGEMENT

[76] Inventor: Karl Baezold, Niederbarnstrasse 13, Frankfurt am Main, Germany

[22] Filed: Dec. 21, 1970

[21] Appl. No.: 100,209

[52] U.S. Cl. .......................... 188/196 D, 188/71.9
[51] Int. Cl. ............................................ F16d 65/56
[58] Field of Search .......... 188/71.8, 71.9, 79.5 GE, 188/196 D, 196 F

[56] References Cited
UNITED STATES PATENTS

| | | | |
|---|---|---|---|
| 2,949,173 | 8/1960 | Peras | 188/196 D |
| 3,244,260 | 4/1966 | Frayer | 188/196 D |

Primary Examiner—Duane A. Reger
Attorney—Arthur O. Klein

[57] ABSTRACT

Mechanical adjusting arrangement, in particular for braking members in motor vehicles, which are operated by means of a self-braking or non-reversible outer thread set or a pair of cooperating curved cam elements corresponding thereto for adjusting an abutment, there being a reversible central and coaxial inner thread set or curved pair of elements, one thread of each of the two thread sets being disposed upon the same rotatable spindle, the two thread sets having the same lead and being of the same hand. The outer thread set also serves to support the rotatable spindle; the inner, central thread set is freely mounted and is used to drive the rotatable spindle. In the disclosed embodiment the outer thread set is composed of a thread on a brake-operating piston mounted for axial reciprocation and held from rotation about its longitudinal axis, the other thread of such set being that on the outer surface of the adjusting spindle.

13 Claims, 5 Drawing Figures

Inventor:
KARL BAEZOLD

MECHANICAL ADJUSTING ARRANGEMENT

This invention relates to a mechanical adjusting mechanism, and more particularly a mechanism useful to render brakes, such as automotive disc brakes, self-adjusting. In such self-adjusting mechanisms for brakes, there is usually an abutment means which is adjusted as required to compensate for the wearing of a brake shoe.

In one prior self-adjusting mechanism for brakes, which is provided with a steep thread, there is sometimes slippage of the nut on the thread when the brakes are applied, such slippage being in the direction opposite from the direction of motion of the brake shoe. In those cases where such slippage of the nut along the screw is prevented, as by means of the provision of conical bearing surfaces which are forcibly moved, there may occur a small elastic deformation of the parts forming the abutment for the brake shoe operating mechanism, in view of the large forces to which such elements are subjected.

In another known mechanism for the self-adjustment of brakes, there are employed self-braking threaded spindles, adjustably driven by a rotary driving means. In practice, because of the wear imposed upon them, the self-braking thread spindles must be readily replaceable. In such constructions there have been provided a self-braking spindle with a cam guide means which is coaxial of the spindle and which is turned to follow the movement of the spindle. The resulting adjusting path, because of inherent limitations of space, is substantially smaller than the instantaneous amount of wear of the brake shoe. Since the amount of wear of the brake shoe is small, the resulting adjustment of the adjusting mechanism is still smaller; this requires the entire construction of the brake and the self-adjusting mechanism to be extremely precise, in order to provide a correct brake-adjusting function. Of course, with such necessary increased precision, the possibility of the malfunctioning of the brake and its parts is increased. Due to these facts, the manufacture of this type of self-adjusting brake is no longer economically feasible.

In the mechanical self-adjusting arrangement in accordance with the present invention, there is employed a radially outer, self-braking thread set or a corresponding set of helical guide means, the drive for the adjusting means being a centrally arranged reversible thread set or a corresponding set of cooperating curved guide means. The invention makes use of the fact that the limits of the self-braking or the irreversibility of the outer thread or curved guide set is not dependent upon the lead (pitch $x$ thread number), but are dependent upon the pitch angle, which means that with identical values of lead with sufficiently large differences in diameter a thread set or a curved guide set can be at one time absolutely irreversible or self-braking and on the other hand can be easily free turning. From these considerations, it can be seen that a thread set or curved guide set with a smaller diameter at the central axis of the braking piston, when fixedly connected to the front face of the piston, can be used as a very simple driving means for a coaxial rotatable threaded element on which the brake piston is supported. One must take care, however, that during the adjusting movement all of the flanks of the larger coaxial supporting thread set or curved guide set are moved out of engagement with each other and are post-turned without friction, because otherwise, due to the larger friction radius, there could arise a very substantial opposing torque.

The outer thread set of the coaxial support has, at all times, large thread flanks, such outer thread set being preferably formed as a single thread. The inner thread set, which drives the adjusting means, is preferably made as a plural or multiple thread. This, however, is simply accomplished in practice, and so there results no marked increase in fabrication costs or other difficulties. The construction of the threads in the two thread sets should, as a matter of practice, be as simple as possible; all types of known and suitable thread forms can be used, such as, for example, pointed, flat, trapezoidal types of threads, and similar threads, the types of threads and curved configurations which are combined with each other depending upon the use to which the arrangement is to be put.

The complete adjusting arrangement, therefore, consists only of two thread sets or curved element pairs, wherein the one that is smaller in diameter at all times drives the larger one to adjust it. By means of such pairing of thread sets or curved guide elements, there are avoided the radially directed high-force components which occur in a steep thread support, which require a strong construction with a large amount of material, and cause an elastic deformation of the parts. Thus, with the lead of the central drive thread set being the same as that of the outer thread set, the adjustment effected always amounts to the entire amount of wear of the brake shoe; this is particularly advantageous in cases of high rates of wear of the brake shoes, or after a brake shoe change. In addition, this makes the mechanical sensitivity of the arrangement insignificant. The construction of the mechanism in accordance with the invention is exceedingly strong and simple. The adjustment of the space between the face of the brake shoe and the brake disc or drum can be easily effected by turning one of the members of the pair of threaded elements carrying the outer and inner thread sets.

In the accompanying drawings which form a part of the specification:

Figure 1:
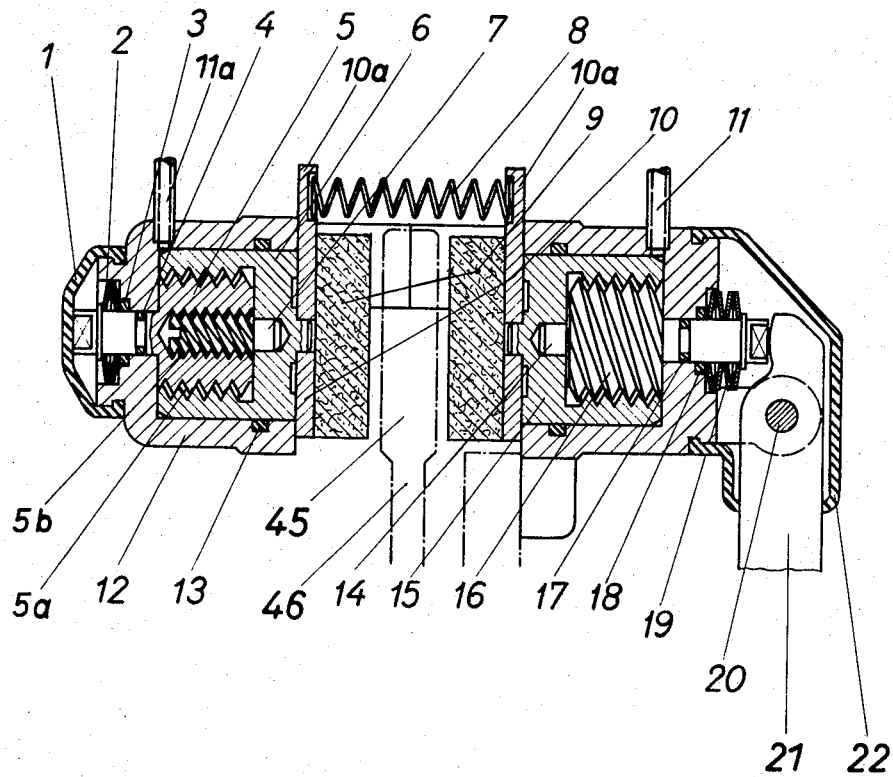
FIG. 1 is a view partially in longitudinal axial section and partially in side elevation of a first embodiment of self-adjusting brake mechanism in accordance with the invention, such device having a central or inner multiple thread set and an outer coaxial single thread set, such thread sets having the same lead and being of opposite hand.

In FIG. 1 there are shown two oppositely disposed coaxial housings 12, 13 which form the cylinders of the braking mechanism. Such housings are supported upon fixed structure, not shown. Mounted in housings 12 and 12 respectively are pistons 6 and 15 which, upon the introduction of fluid under pressure into the rear ends of the cylinders through conduits 11 and 11a move inwardly toward each other. Fixedly connected to the inner, opposing ends of the respective pistons are disc-like brake shoe carriers 10 and 10, respectively upon which there are fixedly secured the brake shoes 9 as shown. The inner ends of the brake shoes 9 confront the opposite annular braking surfaces of the thickened edge portion 45 of a brake disc 46. The distances between the inner, braking surfaces of the members 9 and the surfaces of the portion 45 of the brake disc are exaggerated in FIG. 1 for clarity of illustration.

Means are provided for constantly urging the pistons 6 and 15 into their outer, retracted positions; such means is shown in FIG. 1 as being a coil compression spring 8 which is compressively held between spring seats provided on radial extensions 10a on the brake shoe mounting members 10 and 10.

Considering now the housing 12 and the piston 6 thereof at the left in FIG. 1, there is an adjusting spindle 5 which is mounted coaxial of the housing 12 and of the piston 6. Spindle 5 is in the form of a cup open at its right end, the left end of the cup having a stub shaft integral therewith extending to the left and coaxially thereof. Such stub shaft, which is sealed to the housing 12 by an O-ring 4, is flanged at its outer end, there being two opposed shallowly dished spring rings 2 compressively retained between the flange on the end of the stub shaft and a plastic sealing ring 3 in housing 12 which surrounds the stub shaft. A key or wrench-receiving formation on the outer end of the stub shaft beyond the flange is covered by a removable elastic protective cap 1. The described arrangement retains the spindle 5 in its left hand position abutting the left hand end of the inner wall of the housing 12, but permits its rotation, for adjustment of the inner, retracted end position of the piston 6, upon the removal of the protective cap 1 and the insertion of a suitable key or wrench into the formation on the end of the stub shaft, thereby turning the spindle 5.

A drive spindle or shaft 7, coaxial of the housing 12, the piston 6, and the adjusting spindle 5, has its right hand end press fitted into the forward or right hand face of the piston 6 so that the drive piston 7 is fixedly, non-rotatably mounted upon piston 6. The inner wall of the piston 6, which is of cup-shape and open to the left, is internally threaded, the outer periphery of the adjusting spindle 5 being correspondingly threaded, whereby to form a first, outer thread set 5a. The inner wall of the adjusting spindle 5 is threaded, such threaded inner wall receiving the threaded outer surface of the drive spindle 7; such latter two threads form the second, inner thread set 5b.

As above-described, and shown more clearly in FIGS. 3, 4, and 5, to be discussed below, the first, outer thread set 5a has a single thread. The second, inner thread set 5b is a multiple thread, in this case having two threads. Thread sets 5a and 5b have the same lead (pitch x thread number) and are of the same hand. Thread set 5a is irreversible or self-braking, whereas thread set 5b is reversible under forces encountered when the parts are in the relative positions shown in FIG. 5.

The parts of the brake shown at the right in FIG. 1 are generally similar to those above-discussed found in the portion of the brake at the left. The reference character 13 designates a sealing ring, 14 is a drive spindle, 15 is a right hand brake piston, 16 is an adjusting spindle, 17 is a sealing ring, and 18 is a plastic ring. In this instance there are employed two dish-shaped rings, here designated 19, which are used in tandem. Such springs 19, which bear against the plastic ring 18, cause the return of a swingable hand brake motion-transmitting lever 21 pivoted on a fixed structure of the brake by a pivot pin 20. The upper end of the lever 21 is surrounded by a removable plastic protective cover 22.

Figure 3:
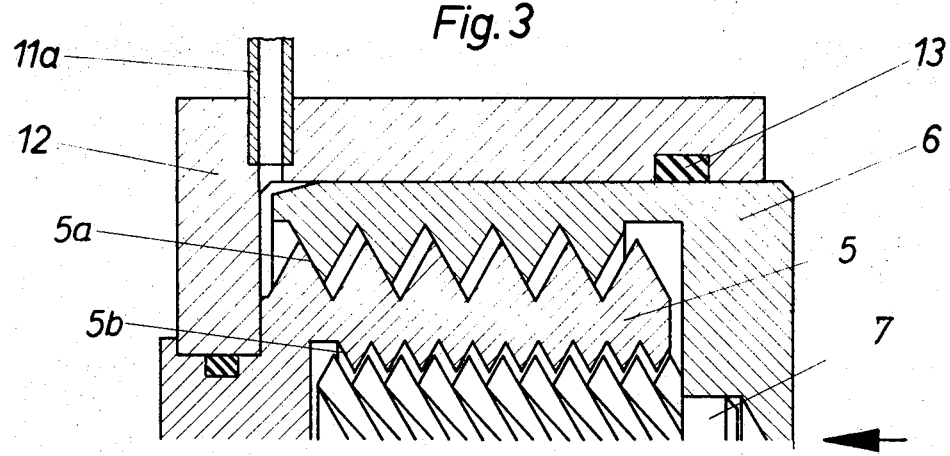
FIG. 3 is a fragmentary schematic view in radial longitudinal section through a left piston and housing of a mechanism similar to that of FIG. 1, the piston being shown retracted to the left into its "brake off" position.
Figure 4:
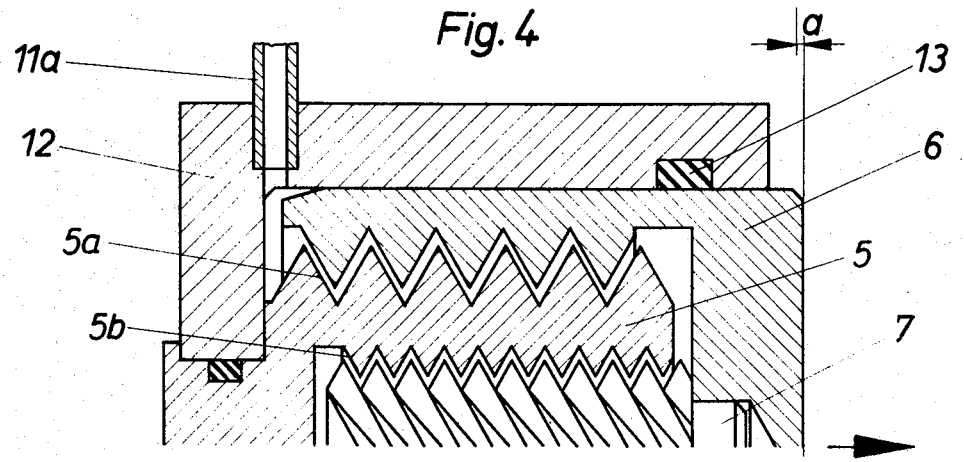
FIG. 4 is a view similar to FIG. 3 but with the piston having been advanced to the right through a distance $a$ in a normal brake-applying stroke.
Figure 5:
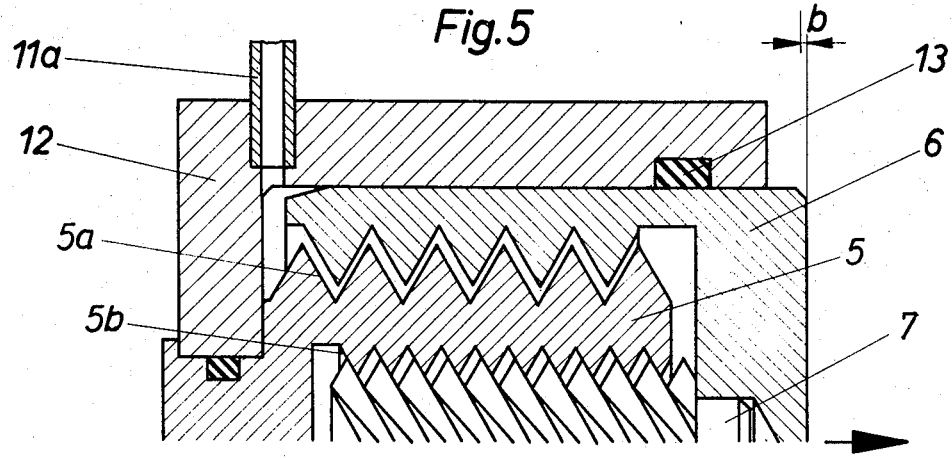
FIG. 5 is a view similar to FIG. 4 but with the piston having been advanced to the right through a distance b thereby adjusting the position of the shaft by engaging it.

The manner of operation of the self-adjusting brake mechanism shown in FIG. 1 and above-described will be clear from a consideration of FIGS. 3, 4, and 5. In FIG. 3, the piston 6 is shown as having been pushed to the left by the spring 8 into its left hand terminal position in which the left hand flanks of the threads on the inner wall of the piston 6 are in abutting engagement with the right hand flanks of the threads on the periphery of the adjusting spindle 5. In such position, the flanks of the threads making up the thread set 5b are somewhat spaced, as shown. In the retracted position of the piston 6 shown in FIG. 3 there is a predetermined minimum spacing between the left hand end of the piston 6 and the confronting end wall of the housing 12. Such space permits the introduction of brake fluid under pressure through the conduit 11a to act upon the left hand end of the piston when the brakes are applied.

FIG. 4 shows the relative position of the parts upon the application of the brakes in a normal braking operation. Braking fluid under pressure has now been introduced into the cylinder through the conduit 11a. As a result, the piston 6 has been thrust to the right through a distance a so as to apply the inner face of the brake shoe 9 to the left hand face of the brake disc portion 45. In such position of the parts, the flanks of the two threads forming the thread set 5a are spaced. This is also true of the flanks of the threads forming the inner thread set 5b. Thus, the arrangement shown allows the free reciprocation of the piston 6 in a normal braking operation through the distance a without causing the operation of the adjustable spindle 5.

In FIG. 5, it is assumed that the brake shoe 9 has worn to such an extent that further travel b of the piston 6 is required in order to apply the brake shoe to the brake disc in a normal braking operation. In such condition, the right hand flanks of the radially outer thread forming the thread set 5b engage the left hand flanks of the radially inner thread of such set. Because of the reversability of the thread set 5b, the adjusting spindle 5 is turned by such action of the thread set 5b so that the outer thread set 5a will now permit the required travel of the piston 6 to the right. At the same time, because of the rotation of the adjusting spindle 5, when the brake is released by ceasing the application of brake fluid under pressure through the conduit 11a, the piston 6 returns to its left hand retracted position in which the threads of the thread set 5a have the relative positions shown in FIG. 3 but the piston 6 now lies at a position which is further to the right by the distance b than it was in FIG. 3, Thus, the inner, braking surface of the brake shoe 9 is always maintained at a predetermined distance from the surface of the brake disc when the brake shoe is in its retracted position.

Figure 2:
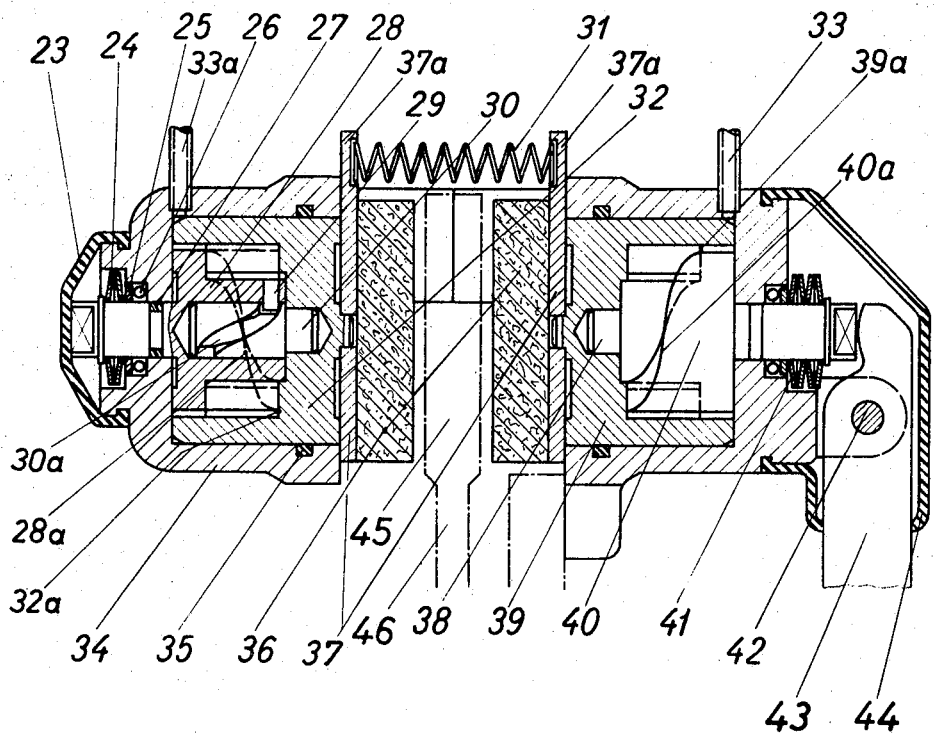
FIG. 2 is a view partially in longitudinal axial section and partially in side elevation of a second embodiment of self-adjusting brake mechanism in accordance with the invention, such mechanism having a central steep set of curved guiding means, and a second, radially outer coaxial set of curved guiding means, the two sets of curved guiding means having the same pitch but being of opposite hand.

The construction shown in FIG. 2 is generally the same as that shown in FIG. 1 with the exception that for the radially inner and outer thread sets 5a and 5b of FIG. 1 there have been substituted, respectively, an inner curved guide in the form of a cam 30a on the drive spindle and a cam follower 29 on the adjusting spindle, and curved guide surfaces, of a hand opposite from that of the cam 30a, on the interior of the piston and the exterior of the adjusting spindle. Such radially outer curved surfaces are designated 39a and 40a in FIG. 2.

A plastic protective cap 23 covers the spindle end which bears the dish-shaped spring 24. Ball bearings 26 roll around a supporting ring or race 25, thus to reduce the friction which is caused by the action of the dish-shaped springs at the bottom of the housing. The elastic ring 27 seals off the projecting end of the adjusting spindle 28. The guide shaft 29 has a pressed fixed connection with the adjusting spindle 28; the guide shaft 29 projects into a guide groove 30a disposed in the drive spindle 30. The drive spindle 30 is fixedly pressed and held in the left brake piston 32. Brake sealing rings 35 are mounted in the brake member housing 34. A brake member 36 is mounted on the brake support 37. The drive spindle 38 is fixedly mounted upon the right piston 39. The dish-shaped springs 41 are mounted on the shaft end of the adjusting spindle 40. The hand brake transmission lever 43 is pivotally mounted by means of a pivot pin 42. A protective cover 44 surrounds the upper end of the lever 43.

When the brake pistons 32 and 39 are subjected to a hydraulic pressure through the conduits 33a and 33, the curved surfaces 39a and 40a, associated with the adjusting spindles 28 and 40, are disengaged and simultaneously push the guide member 29 in the drive spindles 30 and 38 against the guide shaft 29, whereby the adjusting spindles are turned through a corresponding angle to maintain the air gap or space between the inner face of the retracted brake shoe and the brake disc of the same magnitude. The adjusting spindles 28 and 40 can be suitably turned to adjust the retracted position of the brake shoes, upon removing the protective caps 23 and 44 and applying a suitable tool to the now exposed outer ends of such spindles.

The mechanical adjusting arrangement in accordance with the invention can be incorporated as a part of a protective return push means into hydraulic or exclusively mechanical drive systems. Included in such systems are, for example, hydraulic cylinders, freely supported spindles, or the like. In the arrangement of the invention, it will be seen that by means of turning an element the flank play on the opposite flank side can be changed, thereby changing the direction of bearing engagement between the threaded or curved guide bearing parts. This changing or readjusting of the bearing or locking direction can, if need be, be effected in a self-acting hydraulic or mechanical arrangement. It may also be effected electrically.

Although the invention has been illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. A mechanical arrangement for adjusting an abutment means for a longitudinally reciprocable member, said member having first and second surfaces of substantially different diameter coaxial of the axis of reciprocation of the member, an abutment adjusting spindle having third and fourth surfaces confronting the said first and second surfaces, respectively, a first helical guide set formed by cooperating confronting guides on the first and third surfaces, and a second helical guide set formed by cooperating confronting guides on the second and fourth surfaces, the first helical guide set constituting said abutment means and being irreversible under longitudinally directed forces, and the second helical guide set being reversible under longitudinally directed forces, whereby longitudinal movement of the member in excess of that taking up the play in the second guide set rotates the spindle to change the engagement between the guides of the first guide set.

2. An arrangement according to claim 1, wherein the helical guide sets have the same lead and are of the same hand.

3. An arrangement according to claim 1, wherein the helical guide sets are composed of interengaging cooperating threads.

4. An arrangement according to claim 1, wherein the reciprocable member has a main body in the form of a first cup, and comprising a central drive spindle fixedly secured to said main body coaxial thereof, and wherein the adjusting spindle is in the form of a second cup which is coaxial of the first cup and is reversely positioned longitudinally from the first cup, the guides forming the first and second helical guide sets being disposed on the confronting walls of the two cups, and on the inner wall of the second cup and the central drive spindle, respectively.

5. An arrangement according to claim 1, comprising means independently to adjust said abutment means by turning said abutment adjusting spindle.

6. An arrangement according to claim 5, wherein said independent adjusting means comprises a central shaft connected to and extending axially from the abutment adjusting spindle.

7. An arrangement according to claim 4, wherein said independent adjusting means comprises a central shaft connected to and extending axially from the closed end of the second cup forming the body of the abutment adjusting spindle, and means on said shaft whereby it and the adjusting spindle may be turned manually.

8. An arrangement according to claim 7, comprising a fixed housing enclosing said arrangement, said housing having a transverse wall through which said shaft extends and in which it is journalled.

9. An arrangement according to claim 1, comprising yieldable means constantly urging the reciprocable member in one axial direction, and means which overcomes the yieldable means to thrust the reciprocable member in the opposite axial direction.

10. An arrangement according to claim 9, comprising a fixed housing enclosing the arrangement, a cylinder within the housing, the reciprocable member being a piston mounted in said cylinder, and means selectively to conduct fluid under pressure to the space rearwardly of the piston in the cylinder to thrust the piston in said opposite axial direction.

11. An arrangement according to claim 1, comprising a rotatable braking element, and a brake shoe mounted on the reciprocable member and selectively thrust thereby into operative braking engagement with the braking element.

12. A mechanical adjusting arrangement according to claim 1, wherein the locking and support directions of the first helical guide set can be changed as needed by means of a rotational movement of one of the elements carrying at least one of said helical guides.

13. A mechanical adjusting arrangement according to claim 12, comprising means connected to said abutment adjusting spindle whereby it may be rotated manually to change said locking and support directions.

* * * * *